April 7, 1964 F. B. ANDERSON 3,128,436

NEGATIVE FEEDBACK AMPLIFIER

Filed Dec. 16, 1959 4 Sheets-Sheet 1

INVENTOR
F. B. ANDERSON
BY Walter M. Hill
ATTORNEY

INVENTOR
F. B. ANDERSON
BY
Walter M. Hiel
ATTORNEY

April 7, 1964 F. B. ANDERSON 3,128,436

NEGATIVE FEEDBACK AMPLIFIER

Filed Dec. 16, 1959 4 Sheets-Sheet 3

INVENTOR
F. B. ANDERSON
BY
Walter M. Hill
ATTORNEY

INVENTOR
F. B. ANDERSON
BY Walter M. Hill
ATTORNEY

United States Patent Office 3,128,436
Patented Apr. 7, 1964

3,128,436

NEGATIVE FEEDBACK AMPLIFIER

Frithiof B. Anderson, Winston-Salem, N.C., assignor to Bell Telephone Laboratories, Incorporated, New York, N.Y., a corporation of New York Filed Dec. 16, 1959, Ser. No. 860,047
9 Claims. (Cl. 330—79)

This invention relates to an improvement in negative feedback amplifiers and more particularly to an improvement in the feedback networks of such amplifiers.

Feedback amplifiers having hybrid transformer networks in the feedback loop have been known and used for many years. However, the parasitic capacitances and leakage inductances of such transformers have severely limited the maximum feedback which may be utilized. These amplifiers have usually connected a high impedance winding of their hybrid transformers to the mu circuit at one end of the winding and to the feedback circuit at the other end. By the "mu circuit" is meant the amplifying portion of the feedback loop. Such high side connections have several restrictions. They do not reduce the nonlinear distortion of the transformers by large feedback any more than do the terminating impedances provided by the amplifier at its input and output terminals. This leads to a large inductance in the transformer to keep the distortion down which in turn requires a relatively large transformer having a large leakage inductance. Also, the impedance level on the high side of such a transformer is relatively high so that the effects of capacitance in the feedback path are more pronounced. To successfully shape the transmission characteristic of such a feedback loop requires correspondingly large capacitances to be bridged across the transformer windings above the feedback tap and these capacitances, together with the large leakage inductances, seriously limit the bandwidth of the transformers.

Heretofore, these limitations have been avoided to a large degree by employing the so-called low side hybrid feedback circuit which permits the use of smaller transformers having smaller leakage inductances. Also, the lower impedance level inherent in this type of feedback circuit tends to greatly reduce the effects of capacitance. As a result of both the smaller inductance and smaller capacitance effects, wider transmission bands are possible. Nevertheless a serious disadvantage of such transformers with separate mu circuit windings has been the leakage inductance which, although smaller than for the high side connection, still appears as a series element in the feedback loop. This difficulty has been overcome to some extent by providing additional internal feedback loops to supplement the main loop transmission through the hybrid transformers. This additional complexity results in difficult design problems again fraught with physical limitations.

It is an object of this invention to improve the gain-bandwidth product of amplifiers having transformers in their feedback loops.

It is another object of this invention to reduce certain parasitic impedances ordinarily inherent in transformers used in the feedback loop.

It is a still further object to reduce and utilize to advantage the residual parasitic impedances presented by a transformer network in a feedback loop.

The foregoing objects are achieved by this invention which comprises a negative feedback amplifier having an autotransformer with a plurality of winding sections, at least one section of which is connected to the mu circuit of the amplifier with additional impedances connected to intermediate junctions between the winding sections or to the ends of outside sections to form portions of the feedback circuit. The troublesome parasitic parameters are thrown into innocuous parts of the feedback loop to permit a realization of substantially all of the available feedback so that a larger gain-bandwidth product can be realized. This invention is useful not only for amplifiers having a flat overall gain characteristic but also for those with a frequency-shaped gain characteristic. All of the advantages heretofore inherent in amplifiers using hybrid transformers in their feedback loops are retained.

The invention may be better understood by referring to the accompanying drawings in which.

Figure 4:
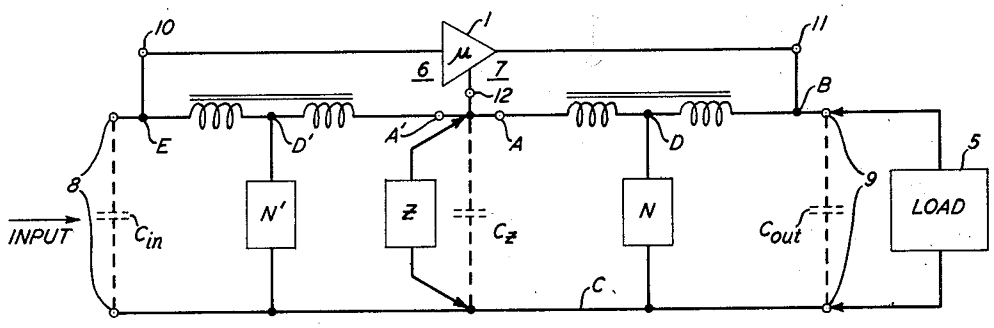
FIG. 4 is illustrative of one embodiment of this invention disclosing a pair of autotransformers each having two winding sections.
Figure 5:
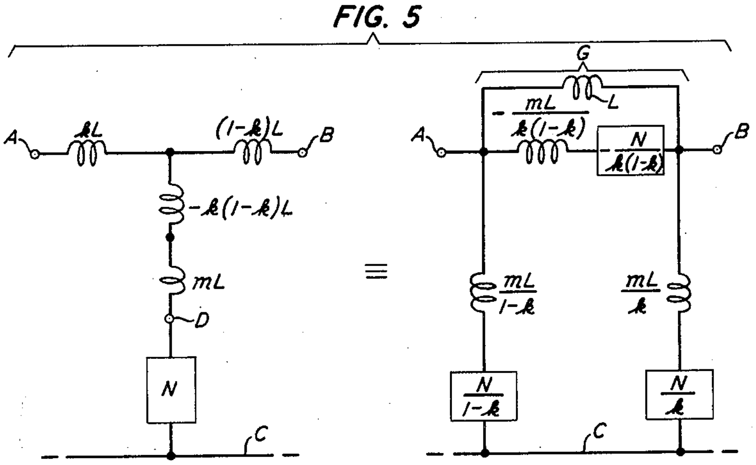
Figure 6:
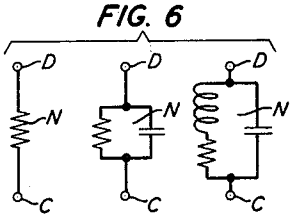
Figure 7:
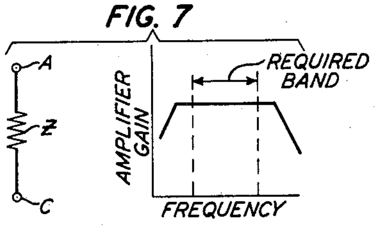
Figure 8:
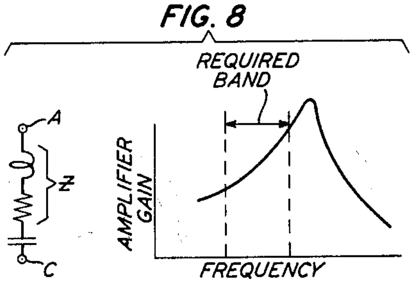
Figure 9:
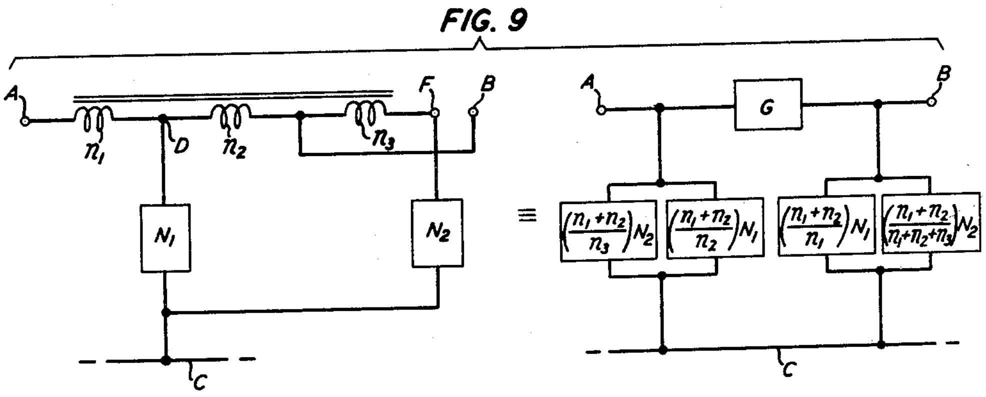
Figure 10:
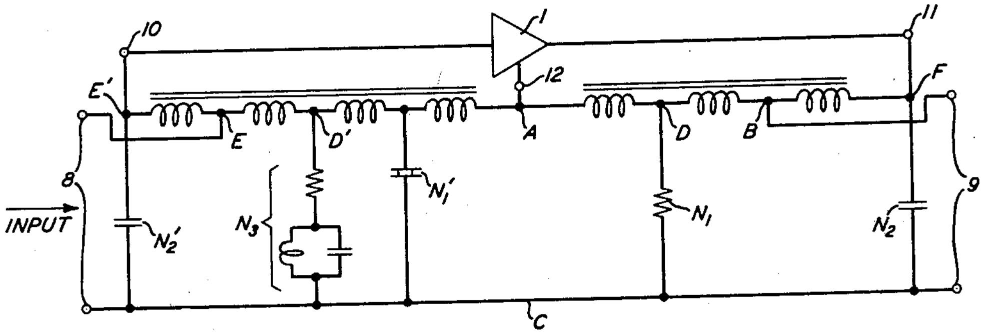
Figure 11:
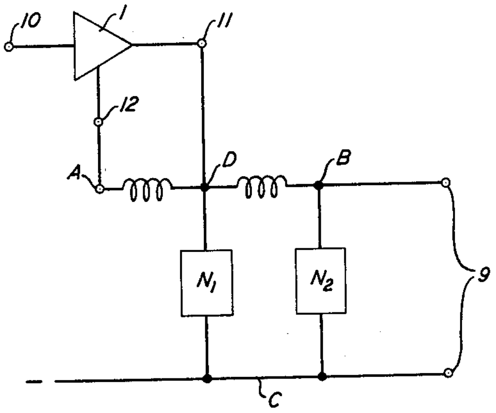
Figure 12:
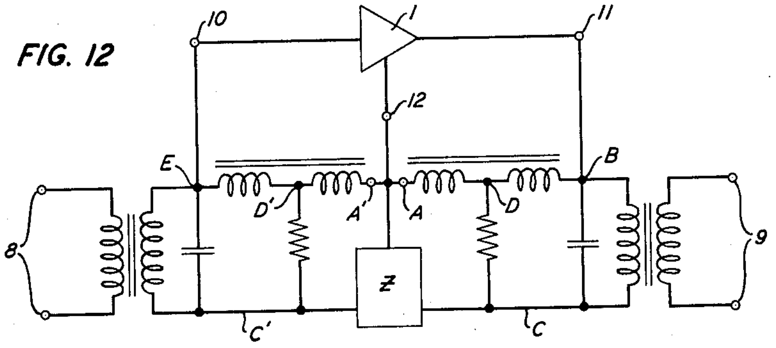
Figure 13:
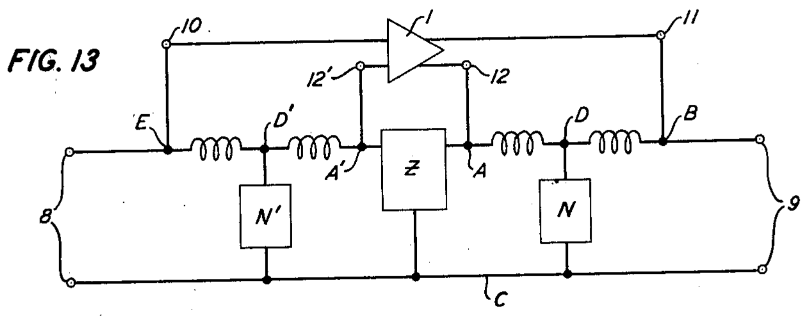

FIG. 5 discloses equivalent networks formed by the autotransformers of FIG. 4 and certain of the feedback networks associated therewith;

FIG. 6 is illustrative of some two-terminal networks which may be employed in the feedback network of FIG. 4;

FIG. 7 shows another two-terminal network which may be included in the feedback path of the circuit of FIG. 4 to provide a substantially flat frequency characteristic;

FIG. 8 shows an alternative form of impedance which may be used in the circuit of FIG. 4 to provide a sloped gain characteristic;

FIG. 9 discloses a three-winding autotransformer and associated network impedances which may be used in place of the autotransformer shown in FIG. 4;

FIG. 10 discloses another feedback amplifier circuit similar to that shown in FIG. 4 but utilizing a four-section autotransformer connected to the input circuit of an amplifying means and a three-section autotransformer connected to its output circuit;

FIG. 11 shows an alternative connection of the transformer to the mu circuit; and FIGS. 12 and 13 show still further embodiments of the invention employing a three-terminal feedback coupling network.

Figure 1:
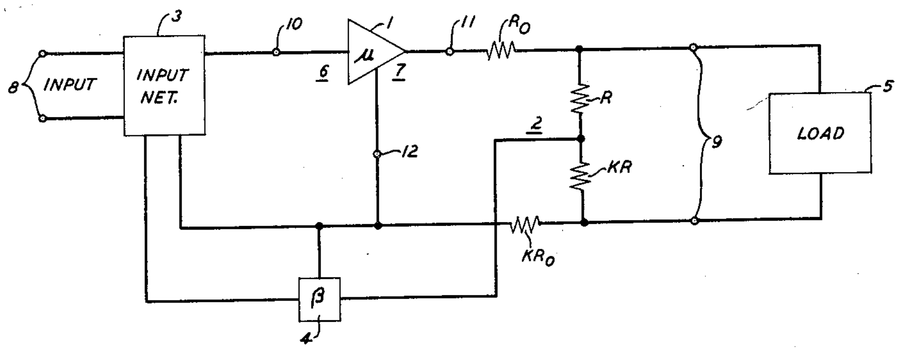
FIG. 1 PRIOR ART
FIGS. 1 and 2 are illustrative of prior negative feedback amplifiers in which bridge type feedback has been employed.

FIG. 1 shows a conventional bridge type feedback network of the type disclosed in FIG. 5 of United States Patent 2,102,671 to H. S. Black, issued December 21, 1937. Transformers are frequently used in the feedback loop of amplifiers such as this. The amplifying means 1 has an input circuit 6 having an input terminal 10, an output circuit 7 having an output terminal 11 and a common terminal 12. In accordance with the symbols used in the Black patent, the resistor $R_0$ connected to terminal 11 is the output impedance of the amplifying means 1. This impedance and impedances R, KR, and $KR_0$ comprise a bridge network in the output circuit of the amplifying means and are so proportioned as to cause the load circuit at terminals 9 and the feedback network, commonly called the beta network 4, to be mutually conjugate so that neither can react upon the other. A similar network, not shown in FIG. 1 but represented by block 3, is included in the input circuit and has similar properties with respect to the input terminals 8 and the beta network 4. While this circuit has many of the desirable properties attributed to negative feedback amplifiers, it not only is subject to noise generated in the bridge resistors but it also has other well known undesirable characteristics.

Figure 2:
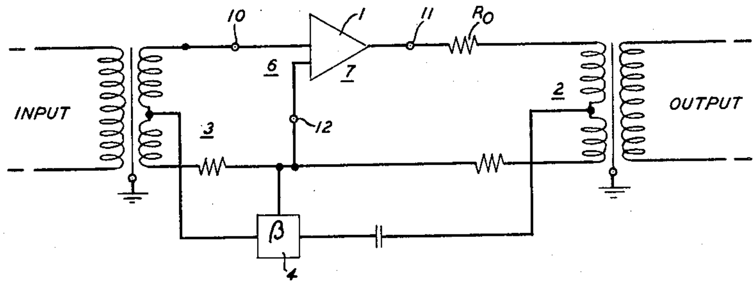
FIG. 2 PRIOR ART

Some of these undesirable characteristics are avoided by the transformer network of FIG. 2 which is similar to FIG. 1 except that two winding sections in the primary of a transformer are employed in place of resistors R and KR in the bridge network. This circuit is of the type shown in FIG. 1 of United States Patent 2,210,001, granted August 6, 1940, to E. H. Perkins. As is well known, frequency shaping properties can be provided in the beta network 4 in each of these amplifiers, this network also controlling the amount of feedback. If transformers are used in the circuit of FIG. 1, the difficulty with leakage reactances would be present. However, resistances do produce a considerable amount of noise and transmission loss in amplifiers. The circuit of FIG. 2 partially obviates this difficulty by use of transformers of the type shown which, however, have the inherent disadvantage of presenting relatively large leakage reactances.

It is desirable to use resistive input and output impedances for such amplifiers because they provide reasonably small reflection coefficients when working with electric wave filters, cables or other types of transmission circuits. Also, where adjustable pads or equalizers are needed, a stable resistive impedance offers a firm base of reference. In the present invention, the advantages of resistive impedances may be realized by simulating the effect of physical resistances without actually using them in the circuit. While these advantages may be realized to some extent by the bridge-type circuits of FIGS. 1 and 2, there remain inherent disadvantages in that maximum feedback, maximum distortion reduction by feedback, and maximum signal-to-noise ratio cannot be realized at the same time. The present invention which simulates the resistances, provides low noise operation in both the input and output circuits. Even more importantly, both the input and the output circuits can be made to dissipate much less power than they would if an equivalent physical resistor were actually connected in that circuit.

Figure 3:
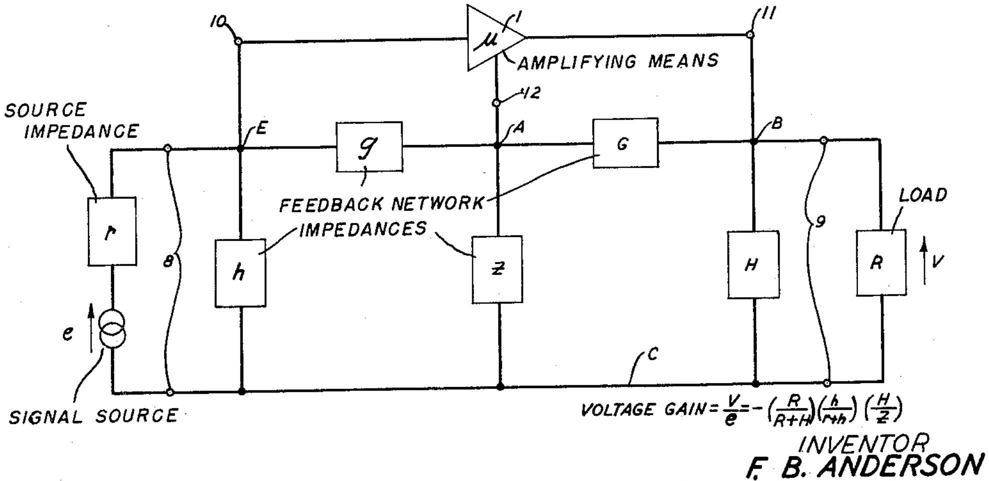
FIG. 3 is a block diagram of a feedback amplifier illustrative of some of the basic circuit principles of this invention.

FIG. 3 shows an amplifier feedback network in block form of the type realized by the autotransformer networks of this invention. This figure is not to be taken as an actual physical embodiment of the invention but rather as a theoretical equivalent network formed by the transformers and their associated feedback circuit elements. In practice, this network, having the properties disclosed herein, would be very difficult to realize without the autotransformers. However, it serves to illustrate the principles of the invention by showing an equivalent circuit readily understood by those skilled in this art. The amplifying means 1 in this figure, as well as in all other figures showing it, represents any conventional device or circuit capable of producing a large voltage gain symbolized in the drawings by the letter $\mu$. The entire circuit comprises the amplifier. That is, the amplifier includes the amplifying means and the improved transformer feedback circuit of this invention. The asymptotic voltage gain for large feedback for this network is given in this figure, the several letters referring to the various parameters shown in the several blocks. It will be noted that so long as the forward gain through the amplifying means 1 and the feedback are both large, the actual size or character of impedances G and $g$ are substantially immaterial and do not materially affect the gain characteristic of the amplifier. These parameters, therefore, do not appear in the voltage gain expression given in FIG. 3. The impedance $r$ looking back from the input terminals 8 may include the source impedance, the source having an electromotive force $e$. Impedances H, $h$ and Z are impedances of the feedback networks which, along with the impedances G and $g$ will be recognized as comprising a pair of pi networks with the impedance Z combining two adjacent legs of the two networks. The terminals A and B are two of the terminals of the network connected to the output terminals 11 and 12 of amplifying means 1 while conductor C forms the third terminal of this pi network. In the input circuit of amplifying means 1, the terminals of the pi network are E and A along with conductor C. Conductor C, being common to both networks, is regarded as a conductor of reference potential and terminal A as a terminal common to both of the pi networks which is connected to the common terminal 12 of the amplifying means 1.

The autotransformer circuits of this invention can be shown to have the equivalent configuration of the pi networks in FIG. 3. Autotransformers not only can be made to have considerably lower leakage inductances than transformers with separate windings but they can be made to present much of their parasitic capacitances across portions of the network where they cause no trouble and where they can be utilized as parts of the terminating networks.

FIG. 4 discloses a hybrid coupled feedback amplifier illustrative of the principles of this invention in which autotransformers having two winding sections are employed in the input and output circuits. The capacitances $C_{in}$ and $C_{out}$ are representative of the stray capacitances between the input terminals 8 and the output terminals 9, respectively. These capacitances may be further bridged by additional capacitances as required to properly close the feedback loop around the mu circuit, and may also be used to round out filters if included in these circuits. As is well known, such filters can provide a substantially constant resistance with a relatively small reactance over a wide frequency range. In FIG. 4 one of the transformers comprises the two winding sections between terminals A and B and an intermediate terminal D. Terminals A and B are connected to the output circuit 7 of amplifying means 1 while terminal D is connected to a conductor of reference potential C through a two-terminal network N. A transformer and circuit with similar configuration is connected to the input circuit 6 of amplifying means 1 and comprises the network between terminals A′ and E the conductor of reference potential C. A stray capacitance $C_Z$ appears at a junction between terminals A and A′ and the conductor C and this may be bridged by an additional two-terminal impedance Z. The network formed by these two transformers, the network N and its counterpart in the input circuit, the network Z, and the capacitance $C_Z$ comprises the feedback network completing the feedback loop between the output circuit and the input circuit of the amplifying means 1. As mentioned above in connection with FIG. 3, each of these transformer networks can be represented as an equivalent pi network, The equivalent T network shown on the left of FIG. 5 represents the transformer network in the output circuit of FIG. 4. The factor $k$ is the step-down voltage ratio of the autotransformer, the inductance L is the total inductance of the two windings between terminals A and B and the inductance $m$L is the common leakage inductance. This network, by the application of well known circuit transformation theory, can be shown to be equivalent to the pi network on the right of FIG. 5. The direct impedance between terminals A and B in this figure comprises the impedance G of FIG. 3, the direct impedance between terminal B and the conductor C is represented by impedance H of FIG. 3 and the direct impedance between terminal A and conductor C in parallel with a similar direct impedance provided by the transformer network in the input circuit of FIG. 4 comprises the common impedance Z of FIG. 3. As previously stated, however, additional impedances may be connected between terminal A and conductor C to modify impedance Z to give the amplifier a desired frequency characteristic. Further shaping of the transmission characteristic may be provided by the elements of the two-terminal network N.

Some networks suitable for use as network N are shown in FIG. 6. These should be regarded as illustrative only and not in any way restrictive.

Assuming that the amplifier of FIG. 4 has been designed by selecting parameters to give it a substantially flat gain characteristic throughout a desired transmission band, the gain may be increased by the addition of a simple resistor between the terminal A and conductor C. Such a network and an illustrative gain characteristic is shown in FIG. 7. In some applications, however, it is desired that the frequency characteristic be sloped. An example of this is in a cable repeater where it is usually required that the gain increase with frequency throughout the transmission band. This may be supplied by a network of the type shown in FIG. 8 which may be used for the impedance Z in FIG. 4 to give the gain characteristic shown in FIG. 8.

It is often desirable to work into source, load and feedback circuit impedances which are substantially lower than the mu circuit impedances. This is almost invariably true for vacuum tube amplifiers and it is also true for transistor amplifier, but to a much lesser degree.

Such impedance step-down transformation from the mu circuit is accomplished by the addition of a third winding on the autotransformer as illustrated on the left in FIG. 9. Here terminals A, B, and D as well as conductor C correspond to those of the output transformer shown in FIG. 4. The winding section between terminals A and D has $n_1$ turns, the section between terminals D and B has $n_2$ turns and the additional section contain $n_3$ turns as indicated in FIG. 9. This permits the addition of another network $N_2$ between terminal F and conductor C. An analysis of this network shows that its equivalent pi network is that given at the right side of FIG. 9. In this figure $N_1$ and $N_2$ represent the complex impendances of the two networks $N_1$ and $N_2$, respectively, shown in the network on the left of FIG. 9. The exact value of the direct impedance G between terminals A and B is not given as this impedance is not significant in the gain equation for the amplifier as given in FIG. 3. The network $N_2$ ingeneral offers a high impedance in the required passband of the amplifier. Above the passband it offers a relatively smaller impedance to favor transmission around the feedback loop. To a good approximation, the network $N_2$ can be neglected in determining the impedance presented in the passband to the mu circuit by the transformer between terminals A and F. This impedance is desired for design of the transformer. In the design we assume the transformer terminated between terminals A and C and B and C with impedances which match those presented at A and C, and B and C, respectively, by the network $N_1$. The impedance presented to the mu circuit between terminals A and F is then $N_1 (n_1+n_2+n_3)^2/n_1 n_2$; the impedance presented to the load by terminal B and conductor C is $N_1 (n_1+n_2)/n_1$; and the impedance presented to the rest of the feedback network at terminal A and conductor C is $N_1 (n_1+n_2)/n_2$. From the above relations and those given in FIG. 9, one skilled in the art is enabled to design a transformer network giving a desired impedance transformation.

The amplifier circuit shown in FIG. 10 discloses a four-section autotransformer in the input circuit and a three-section autotransformer in the output circuit. The reference characters in this figure correspond to those previously used. It will be noted that the three-section autotransformer in the output circuit is of the type disclosed in FIG. 9. By adding a fourth section as shown in the transformer connected to the input circuit of the amplifying means, it is possible to connect an additional network between conductor C and a junction between winding sections. In this case the network $N_1'$ comprising a piezoelectric crystal is connected as one of these networks, the capacitor $N_2'$ as a second one, and the network $N_3$ between terminal D′ and conductor C as the third one. The network $N_1'$ can be used to produce a high gain peak over a narrow band, which is preferably above the normal transmission band, to provide a convenient indication as to which of several amplifiers are in the line between a receiving terminal and a line fault. This is done by simply measuring the center frequencies of the noise peaks at one end as has been regular practice in submarine cable systems. It is also possible by this means to obtain a measure of tube performance by making gain measurements at these frequency peaks. Network $N_3$, by reason of its reactances, has a frequency characteristic which may be used to provide some frequency shaping.

While transformers with different numbers of sections have been shown in the input and output circuits in FIG. 10, four-section transformers may be used in both places and the several two-terminal networks connected between conductor C and the various junctions on the autotransformers may be similar on the two sides or they may be different, depending upon the results desired. In each case, however, the networks can be analyzed into an equivalent pi network from which the impedance ratio $H/Z$ can be determined so that this factor in the voltage gain equation given in FIG. 3 may be obtained. This ratio in the voltage gain equation may be called the transmission factor because of its significant control over the transmission through the amplifier. It will also be quite apparent from what has already been said that a great variety of combinations of autotransformer networks may be used interchangeably in combination in any given amplifier. For example, a two-section transformer and associated network may be used in the input circuit while a three or four-section transformer and its associated networks are used in the output circuit. The number of transformer sections to be employed depends upon what impedance transformations are necessary and the number of parameters needed to produce the required gain characteristic. While three-terminal amplifying devices have been shown, such devices may sometimes have four or more terminals, as in the case of magnetic amplifiers. This simply means separation of the common terminal 12 into two parts, one for the input circuit and one for the output circuit. The invention, therefore, should not be regarded as restricted to the particular arrangements disclosed in the accompanying drawings but rather that these circuits should be regarded as only illustrative of the invention.

A further illustration of possible transformer connections in accordance with this invention is shown in FIG. 11 wherein the output portion of the mu circuit of the amplifier is connected across only one section of the transformer. In fact, the mu circuit can be connected across any number of the winding sections, depending upon the impedance transformation desired.

FIG. 12 shows a three-terminal network Z connected to the common terminal 12 and separating the conductor of reference potential into two parts, C and C′, respectively. Where this is done, more control of transmission is afforded than by the two-terminal network between terminals A and C, as in FIG. 3. It is apparent that the network Z may also have four or more terminals, so that the transmission properties of the network can be controlled by circuits or impedances connected to any two or more of its terminals. The networks N, such as $N_1$ and $N_2$, may also have three or more terminals for similar purposes. The potential of conductor C′ will be changed with respect to that of C by the insertion of such networks of more than two terminals. This figure also shows the input and output terminals 8 and 9 transformer coupled to their respective input and output circuits of the amplifier.

FIG. 13 shows a three-terminal impedance Z inserted between terminals A and A′, with the third terminal connected to conductor C. The amplifying means 1 has been changed from the simple three-terminal type previously shown to a four-terminal type. The advantages of this circuit are similar to those described for FIG. 12. Aside from these few differences, the circuits of FIGS. 12 and 13 are the same and operate in essentially the same way as those previously described.

The several figures have not included power supply circuits for the sake of clarity. Such circuits are inserted in accordance with well established design practice, keeping in mind that wherever a conductive signal path is broken in order to insert the supply circuit, it must be bridged with a device having a negligibly small signal frequency impedance throughout the transmission band so that the original signal path is still effectively unaltered from a signal transmission standpoint, or the effects of any impedance which is not negligible must be considered. Such devices may be an electric battery, a blocking capacitor, a gaseous discharge tube or a Zener diode. It is frequently desirable to employ Zener diodes to establish suitable bias potentials. Inherently, such diodes generally have an adequately low impedance but they can also be conveniently shunted by a large capacitance where necessary. Since such techniques are common practice, they are not specifically disclosed in the accompanying drawings.

The amplifier of this invention can be caused to present a desirable amount of negative impedance to the external circuit and to increase gain over a wide band or to accentuate gain peaks at certain frequencies by merely reversing certain connections to one or more of the winding sections, thereby rendering negative the step-down voltage ratio $k$ of the autotransformer. Of course, the value of $k$, as well as the other design parameters, must be properly proportioned in accordance with well understood design practices to maintain stability. In FIG. 10, for example, an accentuated gain peak is accomplished by reversing the polarity of the winding section between the network section $N_1$ and terminal A so that the gain peak is accentuated in the region of crystal resonance. By way of a further example, a negative input impedance can be provided by the circuit of FIG. 4 by either reversing the connections of one of the two winding sections between terminals E and A or by simply disconnecting terminal A′ from terminal A, connecting terminal A to termnial D′ and transferring the upper terminal of network N′ to terminal A′.

What is claimed is:

1. An amplifier comprising an amplifying means having an input terminal, an output terminal and a common terminal, a transformer having a plurality of serially-connected winding sections with a pair of outside terminals and intermediate terminals at the junctions between adjacent windings, means connecting said outside terminals between said common terminal and the input terminal of said amplifying means, a conductor of reference potential, at least one two-terminal network connected between said conductor and at least one of said intermediate transformer terminals, an input circuit and an output circuit for said amplifier, means connecting said input circuit between said conductor and a transformer terminal, a second transformer also having a plurality of serially-connected winding sections with a pair of outside terminals and intermediate terminals at their junctions between adjacent windings, means connecting the outside terminals of said second transformer between said common terminal and the output terminal of said amplifying means, at least one two-terminal network connected between said conductor and at least one of the intermediate terminals of said second transformer, and means connecting said output circuit between said conductor and a terminal of said second transformer.

2. The combination of claim 1 and an additional network connected between said conductor of reference potential and the common terminal of said amplifying means.

3. The combination of claim 2 wherein said additional network is of the two-terminal type.

4. The combination of claim 2 wherein said additional network is of the three-terminal type having two of its terminals inserted in said conductor of reference potential.

5. An amplifier comprising an amplifying means having an input terminal, an output terminal and a common terminal, a transformer having two serially-connected winding sections with a pair of outside terminals and an intermediate terminal at the junction of said two windings, means connecting two of said transformer terminals between said common terminal and one of the remaining terminals of said amplifying means, a conductor of reference potential, a two-terminal network connected between said conductor and said intermediate terminal, an input circuit and an output circuit for said amplifier, means connecting one of said circuits between said conductor and an outside transformer terminal, a second transformer having a plurality of serially-connected winding sections with a pair of outside terminals and intermediate terminals at the junctions between adjacent windings, means connecting two of the terminals of said second transformer between said common terminal and the other of said remaining terminals of said amplifying means, at least one two-terminal network connected between said conductor and at least one of the terminals of said second transformer, and means connecting the remaining one of said amplifier input and output circuits between said conductor and a terminal of said second transformer.

6. An amplifier comprising an amplifying means having an input circuit and an output circuit, a transformer having a plurality of serially-connected winding sections with terminals for each section, means connecting at least one of said sections across one of the circuits of said amplifying means, a conductor of reference potential, at least one network connected between said conductor and a winding section terminal, a pair of input terminals and a pair of output terminals for said amplifier, means coupling one pair of said pairs of terminals between a winding terminal on said transformer and said conductor of reference potential, a second transformer having a plurality of serially-connected winding sections with terminals for each section, means connecting at least one of the sections of said second transformer across the remaining circuit of said amplifying means, at least one network connected between said conductor and a winding section terminal of said second transformer, and means coupling the other pair of said pairs of terminals between a winding terminal of said second transformer and said conductor of reference potential.

7. An amplifier comprising an amplifying means having an input terminal, an output terminal and a common terminal, a transformer having a plurality of winding sections connected in series to form junctions at their points of connection, means connecting at least one of said sections between said common terminal and said input terminal, a conductor of reference potential, at least one two-terminal network connected between said conductor and at least one of the junctions between said winding sections, an input circuit and an output circuit for said amplifier, means connecting said input circuit between said conductor and a winding on said transformer, a second transformer also having a plurality of winding sections connected in series to form junctions at their points of connection, means connecting at least one of the sections of said second transformer between said common terminal and said output terminal, at least one two-terminal network connected between said conductor and at least one of the junctions between the winding sections of said second transformer, and means connecting said output circuit between said conductor and a winding on said second transformer.

8. The combination of claim 7 and an additional network connected between said conductor of reference potential and the common terminal of said amplifying means.

9. The combination of claim 8 wherein said additional network is of the three-terminal type having two of its terminals inserted in said conductor of reference potential.

References Cited in the file of this patent

UNITED STATES PATENTS

| | | |
|---|---|---|
| 1,809,879 | Whittle | June 26, 1931 |
| 2,170,645 | Peterson | Aug. 22, 1939 |
| 2,775,655 | Bordewijk et al. | Dec. 25, 1956 |